US012662145B2

(12) United States Patent
Wabersich et al.

(10) Patent No.: US 12,662,145 B2
(45) Date of Patent: Jun. 23, 2026

(54) COMPUTER-IMPLEMENTED METHOD AND SYSTEM FOR PROVIDING SAFE CONTROL INPUTS U(K) FOR ACTUATOR COMPONENTS OF A VEHICLE

(71) Applicant: Robert Bosch GmbH, Stuttgart (DE)

(72) Inventors: Kim Peter Wabersich, Schwaebisch Gmuend (DE); Felix Berkel, Schifferstadt (DE); Thomas Specker, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 184 days.

(21) Appl. No.: 18/596,211

(22) Filed: Mar. 5, 2024

(65) Prior Publication Data

US 2024/0300506 A1 Sep. 12, 2024

(30) Foreign Application Priority Data

Mar. 9, 2023 (DE) ..................... 10 2023 202 096.3

(51) Int. Cl.
*B60W 30/18* (2012.01)
*B60W 50/04* (2006.01)
(Continued)

(52) U.S. Cl.
CPC .......... *B60W 50/087* (2013.01); *B60W 50/04* (2013.01); *B60W 60/0016* (2020.02)

(58) Field of Classification Search
CPC .............. B60W 50/087; B60W 50/04; B60W 60/0016; B60W 50/0098; B60W 2540/10;
(Continued)

(56) References Cited

U.S. PATENT DOCUMENTS 11,814,086 B1 * 11/2023 Bharwani ............... G06F 9/546
2020/0339123 A1 * 10/2020 Ozay ............... B60W 30/18163
(Continued)

FOREIGN PATENT DOCUMENTS

DE 112017003517 T5 3/2019
DE 102019134258 A1 5/2021

OTHER PUBLICATIONS

Rungger and Tabuada: "Computing Robust Controlled Invariant Sets of Linear Systems," IEEE Transactions on Automatic Control, 62(7), (2017), pp. 3665-3670. IEEE Xplore [online]. doi: 10.1109/TAC.2017.2672859.

*Primary Examiner* — Masud Ahmed
(74) *Attorney, Agent, or Firm* — NORTON ROSE FULBRIGHT US LLP

(57) ABSTRACT

A computer-implemented method for providing safe control inputs for actuator components of a vehicle for implementing a specified trajectory. A vehicle state is determined at a first time, and a first set of control inputs for the first time is provided. It is then checked whether the first set of control inputs is safe by checking whether the vehicle state predicted based on the vehicle state and the first set of control inputs for a later second time is safe. The predicted vehicle state is considered safe if it is within a predetermined maximum controlled invariant state set. If the vehicle state is not considered safe, a safe set of control inputs is determined, by modifying the first set of control inputs such that the vehicle state predicted based on the vehicle state and the modified set of control inputs is considered safe.

11 Claims, 2 Drawing Sheets

(51) Int. Cl.
B60W 50/08 (2020.01)
B60W 60/00 (2020.01)

(58) Field of Classification Search
CPC ............. B60W 2540/18; B60W 40/10; B60W
2050/0031
See application file for complete search history.

(56) References Cited

U.S. PATENT DOCUMENTS

| | | | |
|---|---|---|---|
| 2023/0121388 A1* | 4/2023 | Khan ...................... | B60K 35/22 |
| | | | 340/435 |
| 2024/0101153 A1* | 3/2024 | Hoxha .............. | B60W 50/0097 |
| 2024/0157973 A1* | 5/2024 | Pini ................... | B60W 50/0097 |

* cited by examiner

COMPUTER-IMPLEMENTED METHOD AND SYSTEM FOR PROVIDING SAFE CONTROL INPUTS U(K) FOR ACTUATOR COMPONENTS OF A VEHICLE

CROSS REFERENCE

The present application claims the benefit under 35 U.S.C. § 119 of German Patent Application No. DE 10 2023 202 096.3 filed on Mar. 9, 2023, which is expressly incorporated herein by reference in its entirety.

FIELD

The present invention relates to a computer-implemented method and to a system designed therefor for providing safe control inputs u(k) for actuator components of a vehicle for implementing a specified trajectory.

For this purpose, a vehicle state x(k) is determined at a first time k. In addition, a first set of control inputs $u_{per}$(k) for the first time k is provided. When checking whether this first set of control inputs $u_{per}$(k) is safe, it is checked whether the vehicle state x(k+1), which is predicted on the basis of the vehicle state x(k) and the first set of control inputs $u_{per}$(k) for a later second time k+1, is safe.

The vehicle state x(k) at time k is determined by ascertaining at least position and movement data and possibly also further state data of the vehicle at time k. The first set of control inputs $u_{per}$(k) describes a desired intended vehicle control for implementing the specified trajectory. This set of control inputs $u_{per}$(k) can, for example, be simply provided by the driver of the vehicle. If the vehicle is a vehicle that drives in an at least partially automated manner, the first set of control inputs $u_{per}$(k) can also be determined by comparing the vehicle state x(k), ascertained at time k, to the trajectory data of the specified trajectory. In this case, further parameters are generally also taken into account, such as ambient conditions, traffic rules, driving style specifications, etc. Before controlling the actuator components with the provided set of control inputs $u_{per}$(k), an indirect safety check takes place. For this purpose, starting from the vehicle state x(k) at time k and the first set of control inputs $u_{per}$(k), a vehicle state x(k+1) at a subsequent second time k+1 is predicted in order to check whether this predicted vehicle state x(k+1) is safe. Only if this is the case is the first set of control inputs $u_{per}$(k) also considered safe.

Furthermore, the present invention relates to a computer-implemented system for providing safe control inputs u(k) for actuator components of a vehicle for implementing a specified trajectory.

BACKGROUND INFORMATION

Ensuring the functional safety in the vehicle dynamics control is a central task during autonomous driving in SAE classification levels 2+ to 5. German Patent Application No. DE 10 2019 134 258 A1 describes an approach in which it is checked with the aid of a safety controller in a safety path whether the control signal generated by a given performance controller can be applied to the system. A simple PID controller is used for the safety path in order to have formal proof for ending in a safe state. The safety controller is activated if the control signals generated by the performance controller would lead to a violation of predefined thresholds. The thresholds are designed strictly mathematically in order to ensure that the vehicle is operated safely. These thresholds exclusively form physical boundary conditions or limitations of the vehicle state. Further uncertainty factors of the underlying system are not taken into account here.

SUMMARY

The present invention provides a check of the provided control inputs $u_{per}$(k) and measures for determining safe control inputs u(k) in the event that the provided control inputs $u_{per}$(k) cannot be considered safe, because their application would lead to an unsafe vehicle state. These measures allow for a steady transition from the desired intended vehicle control to a safe vehicle control.

This may be achieved according to the present invention in that the predicted vehicle state x(k+1) is considered safe if it is within a predetermined maximum controlled invariant MCI state set $C_\infty$. If the vehicle state x(k+1) is not considered safe, a safe set of control inputs u(k) is determined by modifying the first set of control inputs $u_{per}$(k) such that the vehicle state x(k+1) predicted on the basis of the vehicle state x(k) and the modified set of control inputs u(k) is considered safe or is within the MCI state set $C_\infty$.

The present invention assumes that the vehicle state x(k+1) at a later second time k+1 can be predicted on the basis of a functional relationship of the form $$x(k + 1) = f(x(k), u(k), w(k)) \tag{1}$$

In this case, $x \in R^n$ applies and, for u, $u \in R^m$ applies. For w, $w(k) \in W \subset R^q$ applies, where W denotes the set of all possible sets of disruptive influences and uncertainties within specified boundary conditions. Advantageously, infrastructure-related and environmental-influence-related disturbances and uncertainties and/or system-model-related errors, in particular linearization errors, and/or errors in the determination of the vehicle state are taken into account as disruptive influences with the set W. When checking whether the provided control inputs can be considered safe, further uncertainty factors of the system are thus systematically taken into account in addition to the vehicle-related physical boundary conditions.

The safety conditions of the system (1) are mathematically defined with the aid of limited sets $X \subset R^n$ and $U \subset R^m$, where X denotes the set of all possible vehicle states within specified boundary conditions for the vehicle states, and U denotes the set of all possible sets of control inputs within specified boundary conditions for the control inputs. Examples of boundary conditions that limit the set X of the possible vehicle states include roadway boundaries, a limitation of the maximum speed, or a limitation of the slip angle. The set U of the possible sets of control inputs is typically limited by actuator-related boundary conditions, such as maximum acceleration, maximum braking effect, maximum control speed, maximum steering angle, etc.

The safety conditions defined with the aid of the sets X and U must be maintained during the entire temporal development of the system described by (1), i.e., $$x(k) \in X \text{ and } u(k) \in U \text{ for all } k \in N \tag{2}$$

The present invention uses the concept of a maximum controlled invariant MCI state set $C_\infty$, which is parameterized as follows:

$$C_\infty \triangleq \{x \in R^n \mid h(x) \le 0\},$$

where $h(x(k)) \le 0$ describes the condition that $C_\infty$ comprises all permissible vehicle states $x(k) \in X$ for which a set of control inputs $u(k) \in U$ exists which transfers the vehicle into a safe state for a next time $k+1$, namely, for all possible sets of disruptive influences $w(k) \in W$.

According to an example embodiment of the present invention, a vehicle state $x(k+1)$, which has been predicted on the basis of the vehicle state $x(k)$ and a provided set of control inputs $u_{per}(k)$, is considered safe if it is within the predetermined MCI state set $C_\infty$. For this purpose, it is checked whether the following condition is fulfilled for all possible disruptive influences and uncertainties $w \in W$:

$$h(f(x(k), u_{per}(k), w(k))) \le 0 \text{ for all } w(k) \in W \qquad (3a)$$

In a first variant of the present invention, only the condition (3a) is checked in order to decide whether the provided set of control inputs $u_{per}(k)$ can be used without modification to control the actuator components of the vehicle.

In a preferred embodiment of the method according to the present invention, the decision about a modification of the provided set of control inputs $u_{per}(k)$ is based on a stricter condition (3b) in comparison to (3a) in order to allow for an early modification of the provided control inputs $u_{per}$ and thus a steady transition from the desired intended vehicle control to a safe vehicle control. In this variant, a predicted vehicle state $x(k+1)$ is considered safe and $u_{per}(k)$ is not modified only if the condition:

$$h(f(x(k), u_{per}(k), w(k))) \le (1 - \gamma)h(x(k)) \text{ for all } w(k) \in W \qquad (3b)$$

is fulfilled. For $\gamma$, any value greater than 0 and less than/equal to 1 can be selected, $\gamma \in (0, 1]$. The "aggressiveness" of a safety intervention can thus be specified or adjusted. If $\gamma = 1$, the condition (3b) corresponds to the safety condition (3a). In this case, the safety intervention to be expected is maximally aggressive if the provided set of control inputs $u_{per}(k)$ is not considered safe. This is because an abrupt switchover between the intended desired vehicle control and a vehicle control in safety mode then takes place. If a value between 0 and 1 is selected for $\gamma$, the provided control inputs $u_{per}$ are then already modified at an early stage, whereby a steady transition from the desired intended vehicle control to a safe vehicle control can be realized.

As mentioned above, a safe set of control inputs $u_{per}(k)$ must fulfill the following condition:

$$f(x(k), u(k), w(k)) \in C_\infty \text{ for all } w(k) \in w$$

In an advantageous embodiment of the method according to the present invention, a safe set of control inputs $u(k)$ is ascertained as a result of an optimization problem. The optimization problem has the quadratic target function $$u(k) = \mathrm{argmin}_{u \in U} \|u - u_{per}(k)\|^2 \qquad (4a)$$

and secondary conditions of the form $$h(f(x(k), u, w(k))) \le (1 - \gamma)h(x(k)) \qquad (4b)$$

$$\text{for all } w(k) \in w \qquad (4c)$$

The quadratic target function (4a) ensures that the safe set of control inputs $u(k)$, and thus the resulting safe vehicle control, deviates as little as possible from the provided set of control inputs $u_{per}(k)$ and thus from the intended desired vehicle control.

The secondary condition (4b) corresponds to the condition (3b), wherein any value greater than 0 and less than/equal to 1 can again be selected for $\gamma$, $\gamma \in (0, 1]$, in order to specify the "aggressiveness" of the safety intervention.

In a preferred variant of the method according to the present invention, the prediction of the vehicle state $x(k+1)$ is based on a time-invariant linear system model which can be described by $$x(k + 1) = Ax(k) + Bu(k) + Ew(k) \qquad (5)$$

where $x \in X$, $u \in U$ and $w \in W$, and where A, B and E denote the constant factor sets of the linear system model. In this case, the MCI set $C_\infty$ is a polytopic set of the form $$C_\infty = \{x \in R^n \mid A_c x \le b_c\},$$

The secondary conditions (4b) and (4c) of the optimization problem can be combined with the aid of conventional methods from convex optimization and robust model predictive control to form a sequence of affine conditions for the set of control inputs $u$ sought.

In this case, a safe set of control inputs $u(k)$ can be determined as a result of a parametric quadratic optimization problem, which is particularly advantageous since such optimization problems can be solved at least partially in advance with conventional techniques of parametric optimization. In this case, the optimization problem thus does not have to be solved entirely during the driving operation of the vehicle.

The optimization problem has the quadratic target function $$u(k) = \mathrm{argmin}_{u \in R^m} \|u - u_{per}(k)\|^2 \qquad (6)$$

and linear secondary conditions of the form $$Mu \le b + Hx(k), \qquad (7)$$

where the matrices M and H and the vector b are selected such that the predicted vehicle state $x(k+1) = f(x(k), u(k), w(k))$ is within the predetermined maximum controlled invariant MCI state set $C_\infty$ for all $w(k) \in W$ while maintaining the input limits U.

Advantageously, according to an example embodiment of the present invention, the matrices M and H and the vector b are selected such that the predicted vehicle state x(k+1) f(x(k), u(k), w(k)) fulfills the conditions (4b) and (4c):

$$h(f(x(k), u(k), w(k))) \leq (1 - \gamma)h(x(k)) \text{ for all } w(k) \in W$$

As indicated above, in a preferred variant of the method according to the present invention, solutions u* for the parametric quadratic optimization problem with the linear secondary conditions are predetermined, namely, as $$u^* = C_i + D_i \left[ x(k)^T, u_{per}(k)^T \right]^T \text{ for } R_i \subset X x U$$
$$\text{with } i \text{ so that } \left[ x(k)^T, u_{per}(k)^T \right]^T$$
$$\in R_i$$

where $C_i$ and $D_i$ describe the solution of the quadratic optimization problem as an affine function of the parameters x(k) and $u_{per}(k)$ within a range $R_i$ and $R_i$ denotes different ranges of the space spanned by X and U.

During driving operation, one of the predetermined ranges $R_i$ is then first identified on the basis of the vehicle state x(k) and the provided set of control inputs $u_{per}(k)$ by checking the following condition:

$$\left[ x(k)^T, u_{per}(k)^T \right]^T \in R_i \qquad (8)$$

A safe set of control inputs u(k) is then determined as $$u(k) = C_i + D_i \left[ x(k)^T, u_{per}(k)^T \right]^T. \qquad (9)$$

It should be noted at this point that a provided set of control inputs $u_{per}(k)$ is not modified after mapping according to (8) and by applying equation (9) if this set of control inputs $u_{per}(k)$ is considered safe according to (3a) or (3b).

BRIEF DESCRIPTION OF THE DRAWINGS

The measures according to the present invention and preferred implementation options are explained in more detail below with reference to the figures.

DETAILED DESCRIPTION OF EXAMPLE EMBODIMENTS

Figure 1:
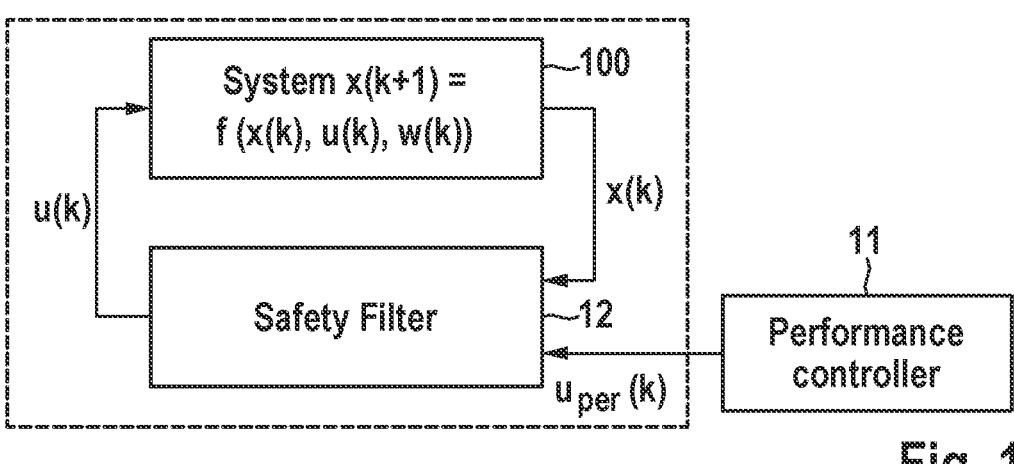
FIG. 1 illustrates the mode of operation of a computer-implemented method according to an example embodiment the present invention for providing safe control inputs u(k) for actuator components of a vehicle for implementing a specified trajectory using a block diagram.

The block diagram of FIG. 1 shows a vehicle system 100 together with components of a computer-implemented system according to the present invention for carrying out a method according to the present invention for providing safe control inputs u(k) for actuator components of a vehicle for implementing a specified trajectory. The actuator components are not shown here. These actuator components are, for example, the speed control, the brake system, the steering system, etc. The trajectory to be implemented can, for example, be derived from a route ascertained by a navigation system on the basis of a specified place of departure and a specified destination for the vehicle.

The method according to the present invention assumes that the current vehicle state x(k) or the state variables describing the vehicle state, such as location, speed, orientation, etc., either can be detected directly or can be determined on the basis of measurement variables. Accordingly, the system according to the present invention (not shown here) comprises perception means for determining a vehicle state x(k) at a first time k. Furthermore, the system according to the present invention comprises a performance controller 11 for providing a first set of control inputs $u_{per}(k)$. This first set of control inputs $u_{per}(k)$ can be provided by the driver of the vehicle, for example by actuating the brake or the accelerator pedal or by a steering intervention. In at least partially automated vehicles, the first set of control inputs $u_{per}(k)$ can however also be ascertained on the basis of a comparison between the vehicle state x(k) and the specified trajectory, and then provided. In any case, this first set of control inputs $u_{per}(k)$ is supplied to a so-called safety filter 12. The safety filter 12 checks whether the first set of control inputs $u_{per}(k)$ is safe. If the first set of control inputs $u_{per}(k)$ is safe, the safety filter 12 passes this first set of control inputs, unchanged, as a safe set of control inputs u(k) to the vehicle system 100. If the first set of control inputs $u_{per}(k)$ is not safe, the safety filter 12 modifies the first set of control inputs $u_{per}(k)$ and thus generates a safe set of control inputs u(k) for the vehicle control. The safety filter 12 is therefore also referred to as a check and modification component.

The safety filter 12 thus outputs a safe set of control inputs u(k) in any case, which set can then be used to control the actuator components of the vehicle.

The temporal development of the vehicle system 100, i.e., the vehicle state x(k+1) at a second later time k+1, results from a functional relationship $$x(k + 1) = f(x(k), u(k), w(k))$$

on the basis of the vehicle state x(k), the applied set of safe control inputs u(k), and all disruptive influences and uncertainties w(k). FIG. 1 illustrates that the check and, where applicable, modification of the provided control inputs $u_{per}(k)$ takes place continuously by setting k+1=k.

Figure 2:
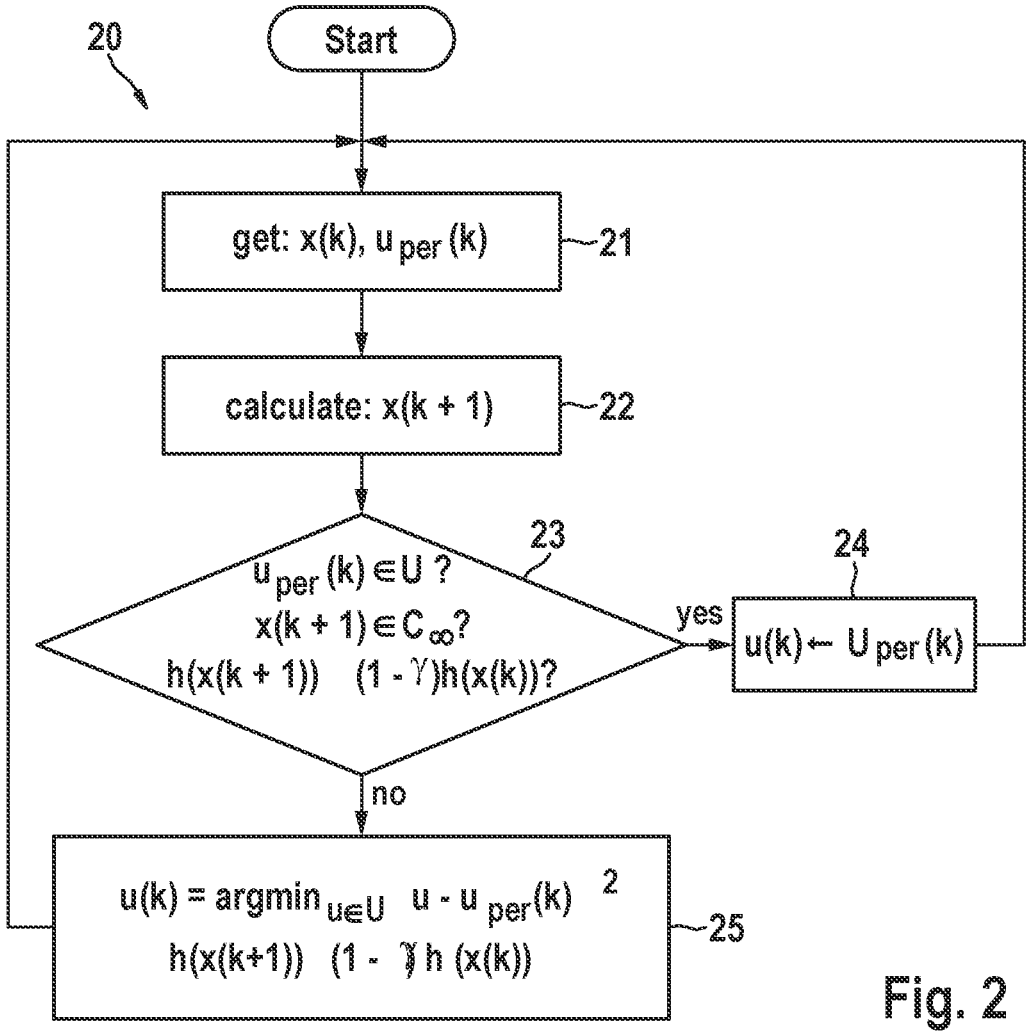
FIG. 2 shows a flow chart of a first example embodiment of the computer-implemented method according to the present invention for providing safe control inputs u(k) for actuator components of a vehicle.

The flow chart 20 of FIG. 2 illustrates a first exemplary embodiment of a method according to the present invention for providing safe control inputs u(k) for actuator components of a vehicle for implementing a specified trajectory.

In a first method step 21, a vehicle state x(k) at a first time k is determined with the aid of suitable perception means. Furthermore, in method step 21, a first set of control inputs $u_{per}(k)$ for the first time k is provided.

The vehicle state x(k) and the provided set of control inputs $u_{per}(k)$ are used in the next method step 22 to predict the vehicle state x(k+1) at a later second time k+1. The corresponding calculation (calculate, x+1) is generally also based on disruptive influences and uncertainties w(k) at time k.

In method step 23, it is checked whether the provided set of control inputs $u_{per}(k)$ is safe.

For this purpose, it is first checked whether the provided set of control inputs $u_{per}(k)$ is permissible, i.e., whether $u_{per}(k) \in U$, where U is the set of all possible sets of control inputs within specified boundary conditions for the control inputs. The boundary conditions for U are generally actuator-related boundary conditions, such as maximum acceleration, maximum braking effect, maximum control speed, maximum steering angle, etc.

It is then checked whether the vehicle state $x(k+1)$ predicted for the later time $k+1$ in method step 22 is safe, since the method according to the present invention assumes that, only in this case, the provided set of control inputs $u_{per}(k)$ can also be considered safe. For this purpose, it is first checked as a necessary condition whether the predicted vehicle state $x(k+1)$ is within a predetermined maximum controlled invariant MCI state set $C_\infty$, $$x(k+1) \in C_\infty$$

where the MCI state set $C_\infty$ is defined such that it comprises all permissible vehicle states $x(k) \in X$ for which a set of control inputs $u(k) \in U$ exists which transfers the vehicle into a safe state for a next time $k+1$, namely, for all possible sets of disruptive influences $w(k) \in W$. In the exemplary embodiment described here, $x(k+1)$, and thus also the provided set of control inputs $u_{per}(k)$, is however only considered safe if the condition $$h(x(k+1)) \leq (1-\gamma)h(x(k))$$

is also fulfilled for all possible sets of disruptive influences $w(k) \in W$, where $\gamma$ is a specifiable value greater than 0 and less than/equal to 1, $\gamma \in (0, 1]$.

If all conditions queried in method step 23 are fulfilled, the provided set of control inputs $u_{per}(k)$ is considered safe, method step 24, and is provided as $u(k)$ to the vehicle system for controlling the actuator components.

If the check in method step 23 reveals that the provided set of control inputs $u_{per}(k)$ cannot be considered safe, this provided set of control inputs $u_{per}(k)$ is modified in order to generate a safe set of control inputs $u(k)$. For this purpose, in the exemplary embodiment described here, in method step 25, the following optimization problem with the quadratic target function $$u(k) = \mathrm{argmin}_{u \in U} \|u - u_{per}(k)\|^2$$

and secondary conditions of the form $$h(x(k+1)) \leq (1-\gamma)h(x(k)) \text{ for all } w(k) \in W.$$

is solved. The resulting set of safe control inputs $u(k)$ is provided as $u(k)$ to the vehicle system for controlling the actuator components.

Method steps 21 to 25 explained above are continuously repeated by setting $k+1=k$ in each case after passing through method steps 24 or 25.

In the design variant described in connection with FIG. 2, the optimization problem for modifying the provided set of control inputs $u_{per}(k)$ must be solved completely during vehicle operation, which requires a comparatively high computational effort.

Figure 3:
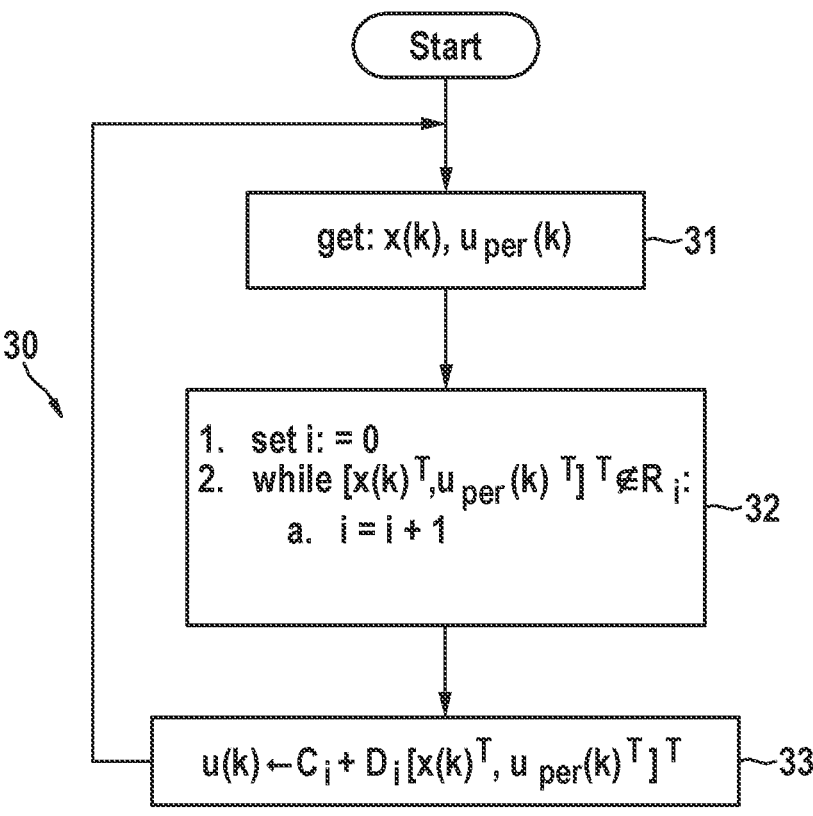
FIG. 3 shows a flow chart of a preferred example embodiment of the method according to the present invention.

FIG. 3 shows a variant of the method according to the present invention which makes use of the fact that the optimization problem described above can be formulated as a parametric quadratic optimization problem with linear secondary conditions under certain preconditions, which are explained in the introduction to the description. Such optimization problems can at least partially already be solved in advance, which is exploited according to the present invention in order to save computing power during driving.

In the exemplary embodiment described here, solutions $u^*$ for the parametric quadratic optimization problem with the linear secondary conditions have accordingly been predetermined, i.e., for example, at the factory. These solutions $u^*$ have the form $$u^* = C_i + D_i\left[x(k)^T, u_{per}(k)^T\right]^T \text{ for } R_i \subset X \times U$$

$$\text{with } i \text{ so that } \left[x(k)^T, u_{per}(k)^T\right]^T \in R_i$$

where $C_i$ and $D_i$ describe the solution of the quadratic optimization problem as an affine function of the parameters $x(k)$ and $u_{per}(k)$ within a range $R_i$ and $R_i$ denotes different ranges of the space spanned by X and U. In this case, $R_i$, $C_i$ and $D_i$ have thus been determined.

The flow chart 30 shown in FIG. 3 shows only method steps that are performed during driving operation.

In a first method step 31, a vehicle state $x(k)$ at a first time $k$ is determined with the aid of suitable perception means. Furthermore, in method step 31, a first set of control inputs $u_{per}(k)$ for the first time $k$ is provided.

In a next step 32, one of the predetermined ranges $R_i$ is identified on the basis of the vehicle state $x(k)$ and the provided set of control inputs $u_{per}(k)$ by checking the following condition by incrementing i:

$$\left[x(k)^T, u_{per}(k)^T\right]^T \in R_i$$

After identifying the range $R_i$ in method step 32, a safe set of control inputs $u(k)$ is then determined in method step 33, wherein the predetermined matrices $C_i$ and $D_i$ are used.

$$u(k) = C_i + D_i\left[x(k)^T, u_{per}(k)^T\right]^T.$$

The resulting set of safe control inputs $u(k)$ is provided as $u(k)$ to the vehicle system for controlling the actuator components.

Method steps 31 to 33 explained above are continuously repeated by setting $k+1=k$ after passing through method step 33.

Since the optimization problem in the variant described above is solved in advance, this embodiment of the present invention is characterized by real-time capability even with limited computing power.

In conclusion, it should also be pointed out that the method according to the present invention can be applied to all types of vehicle dynamics control, i.e., to a lateral control, a longitudinal control, and also a combined approach in which the lateral and longitudinal dynamics are controlled simultaneously. In addition, a wide variety of disruptive influences and uncertainties can be taken into account within the scope of the method according to the present invention.

What is claimed is:

1. A computer-implemented method for providing safe control inputs u(k) for actuator components of a vehicle for implementing a specified trajectory, the method comprising the following steps:

a. determining a vehicle state x(k) at a first time k;

b. providing a first set of control inputs $u_{per}(k)$ for the first time k; and c. checking whether the first set of control inputs $u_{per}(k)$ is safe by checking whether a vehicle state x(k+1) for a later second time k+1 predicted based on the vehicle state x(k) and the first set of control inputs $u_{per}(k)$ is safe;

wherein the predicted vehicle state x(k+1) is considered safe when the predicted vehicle state x(k+1) is within a predetermined maximum controlled invariant (MCI) state set $C_\infty$, and, when the vehicle state x(k+1) is not considered safe, a safe set of control inputs u(k) is determined by modifying the first set of control inputs $u_{per}(k)$ such that a vehicle state x(k+1) predicted based on the vehicle state x(k) and the modified set of control inputs u(k) is considered safe;

wherein the MCI state set $C_\infty$ is described as $$C_\infty \triangleq \{x \in R^n \mid h(x) \le 0\},$$

where $h(x(k)) \le 0$ describes a condition that $C_\infty$ includes all permissible vehicle states $x(k) \in X$ for which a set of control inputs $u(k) \in U$ exists which transfers the vehicle into a safe state for a next time k+1, for all possible sets of disruptive influences $w(k) \in W$; and wherein, when checking whether the predicted vehicle state x(k+1) is safe, it is checked whether the condition:

$$h(f(x(k), u_{per}(k), w(k))) \le (1 - \gamma)h(x(k))$$

is fulfilled for all possible sets of disruptive influences $w(k) \in W$, where $\gamma$ is a specifiable value greater than 0 and less than/equal to 1, $\gamma \in (0, 1]$.

2. The method according to claim 1, wherein the prediction of the vehicle state x(k+1) is based on a time-invariant linear system model which is described by $$x(k + 1) = f(x(k), u(k), w(k))$$
$$= A\,x(k) + B\,u(k) + E\,w(k) \text{ with}$$
$$x \in X, u \in U, w \in W,$$

where $x \in R^n$ and X describes a set of all possible vehicle states within specified boundary conditions for the vehicle states, where $u \in R^m$ and U describes a set of all possible sets of control inputs within specified boundary conditions for the control inputs, where $w \in R^q$ and W describes a set of all possible sets of disruptive influences within specified boundary conditions for the disruptive influences, and where A, B and E denote constant factor sets of the linear system model.

3. The method according to claim 2, wherein, in the time-invariant linear system model, (i) infrastructure-related and environmental-influence-related disturbances and uncertainties, and/or (ii) system-model-related errors including linearization errors, and/or (ii) errors in the determination of the vehicle state, are taken into account as disruptive influences.

4. The method according to claim 1, wherein the safe set of control inputs u(k) is determined as a result of an optimization problem.

5. The method according to claim 4, wherein the safe set of control inputs u(k) is determined as a result of the optimization problem with a quadratic target function $$u(k) = \text{argmin}_{u \in U} \|u - u_{per}(k)\|^2$$

and secondary conditions of the form $$h(f(x(k), u(k), w(k))) \le (1 - \gamma)h(x(k)) \text{ for all } w(k) \in W$$

6. The method according to claim 4, wherein the safe set of control inputs u(k) is determined as a result of a parametric quadratic optimization problem with the quadratic target function $$u(k) = \text{argmin}_{u \in R^m} \|u - u_{per}(k)\|^2$$

and linear secondary conditions of the form $$Mu \le b + Hx(k),$$

where matrices M and H and vector b are selected such that the predicted vehicle state x(k+1)=f(x(k), u(k), w(k)) is within the predetermined maximum controlled invariant MCI state set $C_\infty$ for all $w(k) \in W$ while maintaining input limits U.

7. The method according to claim 6, wherein the matrices M and H and the vector b are selected such that the predicted vehicle state x(k+1) f(x(k), u(k), w(k)) fulfills the condition:

$$h(f(x(k),u(k),w(k))) \le (1-\gamma)h(x(k)) \text{ for all } w(k) \in W$$

for all possible sets of disruptive influences $w(k) \in W$, where $\gamma$ is a specifiable value greater than 0 and less than/equal to 1, $\gamma \in (0, 1]$.

8. The method according to claim 6, wherein solutions u* for the parametric quadratic optimization problem with the linear secondary conditions are predetermined as $$u^* = C_i + D_i \left[ x(k)^T, u_{per}(k)^T \right]^T$$

for $R_i \subset X \times U$ with $i$ so that $\left[ x(k)^T, u_{per}(k)^T \right]^T \in R_i$ where $C_i$ and $D_i$ describe a solution of the quadratic optimization problem as an affine function of parameters $x(k)$ and $u_{per}(k)$ within a range $R_i$ and $R_i$ denotes different ranges of a space spanned by X and U.

9. The method according to claim 8, wherein:

a. one of the ranges is identified based on the vehicle state $x(k)$ and the first set of control inputs $u_{per}(k)$ by checking the following condition:

$$\left[x(k)^T, u_{per}(k)^T\right]^T \in R_i; \text{ and}$$

b. the modified set of control inputs $u(k)$ is then determined as $$u(k) = C_i + D_i\left[x(k)^T, u_{per}(k)^T\right]^T.$$

10. The method according to claim 1, wherein the safe set of control inputs $u(k)$ is determined as a result of an optimization problem with a quadratic target function $$u(k) = \mathrm{argmin}_{u \in U}\|u - u_{per}(k)\|^2$$

and secondary conditions of the form $$h(f(x(k), u, w(k))) \le (1 - \gamma)h(x(k)) \text{ for all } w(k) \in W.$$

11. A computer-implemented system, comprising:

a. a perception arrangement configured to determine a vehicle state $x(k)$ at a first time k, b. a performance controller configured to provide a first set of control inputs $u_{per}(k)$; and c. a check and modification component configured to check whether the first set of control inputs $u_{per}(k)$ is safe, and configured to modify the first set of control inputs $u_{per}(k)$ if the first set of control inputs $u_{per}(k)$ is not considered safe;

wherein the predicted vehicle state $x(k+1)$ is considered safe when the predicted vehicle state $x(k+1)$ is within a predetermined maximum controlled invariant (MCI) state set $C_\infty$;

wherein the MCI state set $C_\infty$ is described as $$C_\infty \overset{\Delta}{=} \{x \in R^n \mid h(x) \le 0\},$$

where $h(x(k)) \le 0$ describes a condition that $C_\infty$ includes all permissible vehicle states $x(k) \in X$ for which a set of control inputs $u(k) \in U$ exists which transfers the vehicle into a safe state for a next time $k+1$, for all possible sets of disruptive influences $w(k) \in W$; and wherein, when checking whether the predicted vehicle state $x(k+1)$ is safe, it is checked whether the condition:

$$h(f(x(k), u_{per}(k), w(k))) \le (1 - \gamma)h(x(k))$$

is fulfilled for all possible sets of disruptive influences $w(k) \in W$, where $\gamma$ is a specifiable value greater than 0 and less than/equal to 1, $\gamma \in (0, 1]$.

\* \* \* \* \*